United States Patent
Huetteman

[11] Patent Number: 5,950,722
[45] Date of Patent: Sep. 14, 1999

[54] METHOD FOR CONTROLLING AN AUTOMOBILE CLIMATE CONTROL SYSTEM AND A CONTROL SYSTEM USEFUL THEREFOR

[75] Inventor: Steven C. Huetteman, Rochester, Mich.

[73] Assignee: Chrysler Corporation, Auburn Hills, Mich.

[21] Appl. No.: 09/148,585

[22] Filed: Sep. 4, 1998

[51] Int. Cl.$^6$ .............................. B60H 1/00; F25B 49/00
[52] U.S. Cl. ........................ 165/202; 62/131; 236/1 R; 454/75
[58] Field of Search .......................... 62/131, 133, 239, 62/244, 161, 163; 454/75; 236/91 C, 91 D, 1 R; 165/202

[56] References Cited

U.S. PATENT DOCUMENTS

| | | | |
|---|---|---|---|
| 5,003,785 | 4/1991 | Petri et al. ................................. | 62/131 |
| 5,222,661 | 6/1993 | Wenhart .............................. | 454/75 X |
| 5,330,385 | 7/1994 | Hotta et al. ................................. | 454/75 |
| 5,494,097 | 2/1996 | Straub et al. .......................... | 62/244 X |
| 5,699,857 | 12/1997 | Flaishans et al. ........................ | 165/202 |

*Primary Examiner*—William Wayner
*Attorney, Agent, or Firm*—Jennifer M. Stec

[57] ABSTRACT

A method is provided for controlling a climate control system having an automatic climate control system and a manual climate control system for an automobile having a convertible top. The method includes the step of detecting whether the convertible top is retracted. A signal indicating whether the convertible top is open is delivered to a climate control unit which includes an algorithm which assists in controlling the mode selection logic based on the results of the detection. The climate control unit creates a mode selection signal based on the results of the algorithm, and sends the mode selection signal to the mode selection logic, the mode selection signal being such that the mode selection actuator actuates the automatic climate control mode when the convertible top is up and the mode selection actuator actuates the manual climate control system when the convertible top is retracted.

11 Claims, 2 Drawing Sheets

METHOD FOR CONTROLLING AN AUTOMOBILE CLIMATE CONTROL SYSTEM AND A CONTROL SYSTEM USEFUL THEREFOR

BACKGROUND OF THE INVENTION

1. Field of the Invention

The present invention relates generally to methods for controlling an automobile climate control system and a control system useful therefor in which the automobile has a convertible top and, more particularly, the automobile has both an automatic climate control system and a manual climate control system.

2. Description of the Related Art

Today's automobiles are equipped with climate control systems which include manual climate control systems and may optionally include automatic climate control systems, both of which control the temperature in the passenger compartment, also referred to as the "interior temperature". The climate control systems control the use of devices, such as blower fans, air conditioning units, heating devices, and air-mix doors or other suitable variable-position air-blending mechanisms.

A manual climate control system includes a control panel through which a passenger may select a desired interior temperature, control the speed of the blower fan, control the air flow direction, and select use of the air conditioning unit or heating device.

An automatic climate control system controls the interior temperature of the automobile without input from the automobile's passengers except for the desired temperature. An automatic climate control system typically includes an ambient temperature sensor for sensing the ambient temperature outside of the automobile, an actual temperature sensor for sensing the actual interior temperature at a given location within the automobile's passenger compartment, a sun-load sensor which senses the relative amount of solar radiation reaching the interior of the automobile, a control panel through which a passenger may select a desired interior temperature, and a control unit which receives the various values from the sensors and the passenger's temperature selection and produces various signals to control the operation of any air conditioning devices, heating devices, blower fans, air flow direction devices, and air-mix doors.

An automobile equipped with an automatic climate control system and which happens to have a convertible top can meet with some operational problems when the convertible top is retracted (down) and the automatic climate control system is operating. For example, when the convertible top is retracted, the interior temperature reading is corrupted by the ambient (outside) temperature which will cause the control unit to attempt to compensate for an inaccurate temperature reading. When operating under these conditions, the climate control system will become unstable or the blower fan may be caused to "lock-up" in high speed.

It is, therefore, one object of the present invention to provide a method for controlling a climate control system of an automobile equipped with a convertible top, so that the climate control system operates more smoothly when the convertible top is retracted than it does without the method.

It is another object of the present invention to provide a special control system useful for controlling a climate control system of an automobile equipped with a convertible top, which special control system causes the climate control system to operate more smoothly when the convertible top is retracted than it does without the control system.

SUMMARY OF THE INVENTION

To achieve the foregoing objects, the present invention provides a method for controlling a climate control system having an automatic climate control system and a manual climate control system for an automobile having a convertible top. The method includes the step of detecting whether the convertible top is retracted. A signal indicating whether the convertible top is open is delivered to a climate control unit which includes an algorithm which assists in controlling the mode selection logic based on the results of the detection. The climate control unit creates a mode selection signal based on the results of the algorithm, and sends the mode selection signal to the mode selection logic, the mode selection signal being such that the mode selection actuator actuates the automatic climate control mode when the convertible top is up and the mode selection actuator actuates the manual climate control system when the convertible top is retracted.

Other objects, features, and advantages of the present invention will be readily appreciated as the same becomes better understood after reading the subsequent description taken in conjunction with the appended drawings.

BRIEF DESCRIPTION OF THE DRAWINGS

The present invention will become more fully understood from the detailed description and the accompanying drawings, wherein.

DESCRIPTION OF THE PREFERRED EMBODIMENT(S)

One embodiment of the present invention generally entails a stabilizer control system for controlling the actuation of the climate control system for an automobile with a convertible top. The climate control system of the automobile includes an automatic climate control mode and a manual climate control mode, which are both described hereinabove.

Without the stabilizer control system, an automobile with a convertible top and an automatic climate control mode could experience some undesirable operation of the automatic climate control system when the convertible top is retracted. The automatic climate control mode operates based on the temperature reading of the automobile interior. However, with the convertible top retracted, the temperature of the automobile interior would be corrupted by the ambient (outside) temperature. The automatic climate control mode would then attempt to achieve an interior temperature that may not be achievable.

The stabilizer control system of the present invention, when included as part of the automobile's entire control system, helps stabilize the operation of the climate control system when the convertible top is retracted. The stabilizer control system of the present invention would limit the operation of the climate control system to the manual climate control mode when the convertible top is retracted. When the convertible top is subsequently raised, the stabilizer control system of the present invention would cause the climate control system to return to the automatic climate control mode. In a particular embodiment of the stabilizer control system, the stabilizer control system would resume operation to the automatic climate control mode and would recall the selected interior temperature that was previously selected when the automatic climate control system was last in operation.

The stabilizer control system of the present invention generally includes a convertible top sensor for detecting whether the convertible top is retracted and a climate control unit which is in electronic communication with the convertible top sensor and is capable of creating a signal (which will be referred to as the mode selection signal) based on the detection results of the convertible top sensor.

The convertible top sensor senses directly whether the convertible top is retracted, and the information is transmitted to a climate control unit. The information may be transmitted via direct wire to the climate control unit or it may be transmitted first to an intermediate computer module, such as the industry standard, J-1850, and subsequently transmitted to the climate control unit.

As discussed hereinabove, various other sensors, such as the ambient temperature sensor, the actual temperature sensor, and the sun-load sensor, also provide data to the climate control unit. In addition, the temperature selector, by which a passenger may select a desired interior temperature, is electronically connected to the climate control unit.

Figure 1:
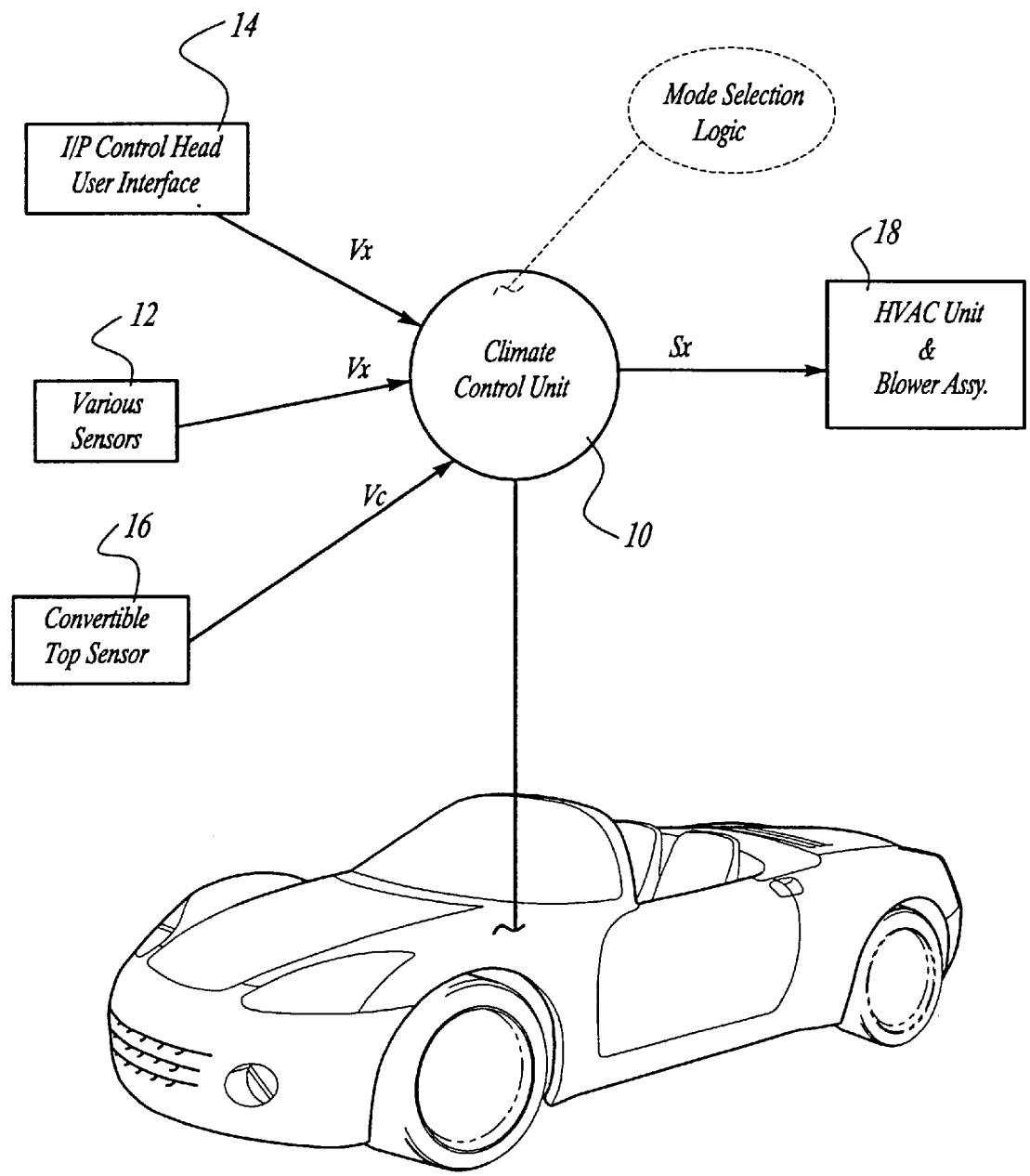
FIG. 1 is a schematic of a climate control system for an automobile according to the present invention.

FIG. 1 schematically illustrates the general flow of information to and from the climate control unit 10. The aforementioned various sensors 12 and control user interface 14 generate the respective various values ($V_x$) which are transmitted to the climate control unit 10. The convertible top sensor 16 is shown apart from the other sensors and provides the value, $V_C$, to the climate control unit indicating whether the convertible top is retracted (down) or up. Preferably, the data from the convertible top sensor 16 is transmitted to the climate control unit 10 often, for example, every few seconds, preferably, every 500 ms, so that the operation of the climate control system may be kept current. The convertible top sensor 16 can be employed in the convertible top control circuit and therefore would detect when the convertible top control circuit has been operated to raise or lower the convertible top. Alternatively, the convertible top sensor 16 can be employed on the convertible top itself for detecting when it is in the raised or lowered position.

The climate control unit 10 processes the various data received and produces signals to operate the devices of the climate control system accordingly. The signals, $S_x$, are generated when the automatic climate control system is operating and are provided to actuators 18 which control the operation of devices such as the air conditioning unit, the heating device, the blower fan, and the air-mix door. In addition, a signal, $S_m$, referred to as the mode selection signal, is transmitted to the mode selection logic provided within the climate control unit 10. The mode selection logic is capable of actuating the proper control system whether it be the automatic climate control mode or the manual climate control mode. The automatic climate control mode will be actuated or continued in operation if the convertible top is up, and the manual climate control mode will be actuated or continued in operation if the convertible top is retracted. It should be understood that the climate control system of an automobile is typically designed so that a passenger may optionally override the automatic climate control mode by selecting the manual mode.

Figure 2:
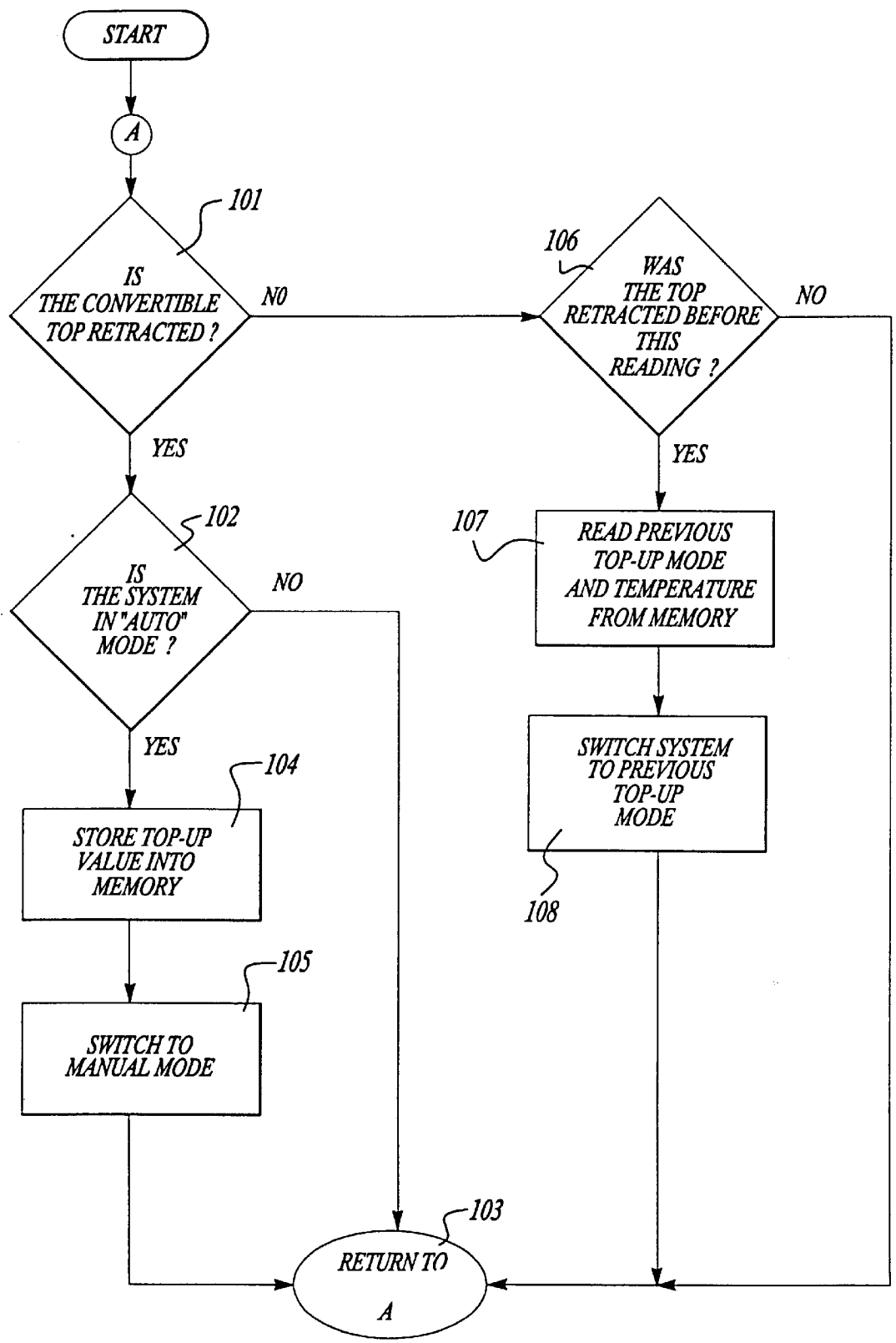
FIG. 2 is a schematic of an algorithm useful for assisting in controlling the climate control system of an automobile according to the present invention.

To assist in determining the operation of the mode selection logic, the climate control unit may include an algorithm such as that which is illustrated in FIG. 2. FIG. 2 illustrates that the algorithm first determines whether the convertible top is retracted or up in Step 101. If the convertible top is retracted, the algorithm continues to Step 102 and determines whether the climate control system is operating in automatic mode. If the climate control system is operating in the manual mode, the climate control unit has no changes and proceeds to Step 103. However, if the climate control system is operating in automatic mode, the flow continues to Step 104 where the climate control unit stores a top-up mode value into memory. The top-up mode value includes the desired interior temperature selected by the passenger which was selected when the automobile was in the automatic climate control mode.

After the top-up mode value is stored in the memory of the climate control unit, the climate control unit creates a signal which switches the operation of the climate control system to manual mode according to Step 105 and flow continues to Step 103. Once in manual mode, the passenger controls the operation of the climate control system and may select a new desired interior temperature.

If the convertible top is not retracted as determined in Step 101 (i.e., it is up), the algorithm determines whether the convertible top was retracted during the most recent (immediately preceding) run through the algorithm in Step 106. If the convertible top was not retracted during the most recent run through the algorithm, the algorithm proceeds to Step 103 and the operation of the climate control system remains the same. However, if the convertible top was retracted during the most recent run through the algorithm, the climate control unit reads the top-up mode value which is stored in the unit's memory and switches the climate control system to the top-up mode in Steps 107 and 108. The top-up mode is the automatic mode of the climate control system and includes any specifics which are stored in memory, such as the desired temperature which was selected when the convertible top was last up.

The present invention is implemented into a climate control system having an automatic climate control system and a manual climate control system. The method generally entails detecting whether the convertible top is retracted; transmitting the results of the detection to a climate control unit which includes an algorithm which assists in creating a mode selection signal based on the results of the detection. A mode selection signal based on the results of the algorithm is sent to a mode selection actuator. The mode selection signal is such that the mode selection actuator actuates the automatic climate control system when the convertible top is up and the mode selection actuator actuates the manual climate control system when the convertible top is retracted.

Preferably, the climate control unit has a memory and the method further includes storing a top-up mode value into the memory of the climate control unit. The top-up mode value may include the desired interior temperature selected by a passenger of the automobile. The top-up mode value is desirably stored when the convertible top has been retracted and the climate control system has not yet been switched to manual mode (i.e., the automatic climate control system is still operating). Consequently, the top-up mode value is best stored after transmitting the results of the detection regarding the convertible top to the climate control unit but before creating the mode selection signal.

When the convertible top is subsequently raised after being retracted, the method of the present invention includes reading the stored top-up mode value. The mode selection signal created is then in the form such that the automatic climate control system returns to operation and is based on the stored top-up mode value. The reading of the stored top-up mode value is logically performed after transmitting the results of the detection regarding the convertible top to the climate control unit and before creating the mode selection signal.

Accordingly, the method and the stabilizer control system of the present invention are suitable for controlling a climate control system of an automobile equipped with a convertible top, so that the climate control system operates more smoothly when the convertible top is retracted than it does without the method or stabilizer control system.

The present invention has been described in an illustrative manner. It is to be understood that the terminology which has been used is intended to be in the nature of words of description rather than of limitation.

Many modifications and variations of the present invention are possible in light of the above teachings. Therefore, within the scope of the appended claims, the present invention may be practiced otherwise than as specifically described.

What is claimed is:

1. A method for controlling a climate control system having an automatic climate control system and a manual climate control system for an automobile having a convertible top, the method comprising:

detecting whether the convertible top is retracted;

transmitting the results of the detection to a climate control unit which includes an algorithm which assists in controlling mode selection based on the results of the detection;

creating a mode selection signal based on the results of the algorithm; and sending the mode selection signal to the climate control unit, the mode selection signal being such that the climate control unit actuates the manual climate control system when the convertible top is retracted.

2. The method of claim 1, wherein the climate control unit has a memory and the method further comprises, after transmitting the results of the detection to the climate control unit and before creating the mode selection signal, storing a top-up mode value into the memory of the climate control unit.

3. The method of claim 1, wherein the climate control unit has a memory and the method further comprises, after transmitting the results of the detection to the climate control unit and before creating the mode selection signal, storing a top-up mode value into the memory of the climate control unit when the convertible top is retracted and the automatic climate control system is operating.

4. The method of claim 1, wherein the climate control unit has a memory which has a top-up mode value stored therein, and the method further comprises reading the stored top-up mode value after transmitting the results of the detection to the climate control unit and before creating the mode selection signal.

5. The method of claim 1, wherein the climate control unit has a memory which has a top-up mode value stored therein and the mode selection signal created is in the form such that the automatic climate control system returns to operation based on the stored top-up mode value, and the method further comprising, after transmitting the results of the detection to the climate control unit and before creating the mode selection signal, reading the stored top-up mode value.

6. The method of claim 1, wherein the climate control system includes heating and air conditioning devices.

7. A climate control system having an automatic climate control system and a manual climate control system for an automobile with a convertible top, the climate control system comprising:

a convertible top sensor for detecting whether the convertible top is retracted and a climate control unit which is in electronic communication with the convertible top sensor and is capable of creating a mode selection signal based on the detection results of the convertible top sensor; and a mode selection actuator which is in electronic communication with the climate control unit and is capable of receiving the mode selection signal from the climate control unit and capable of actuating the proper control system selected from the automatic climate control system and the manual climate control system, the automatic climate control system being actuated when the convertible top is up and the manual climate control system being actuated when the convertible top is retracted.

8. The climate control system of claim 7, wherein the climate control unit has a memory for storing a top-up mode value.

9. The climate control system of claim 7, wherein the climate control unit has a memory for storing a top-up mode value which includes the desired temperature selected by a passenger.

10. The climate control system of claim 7, wherein the climate control unit has a memory for storing a top-up mode value and is capable of reading the stored top-up mode value.

11. The climate control system of claim 7, wherein the climate control system includes heating and air conditioning devices.

* * * * *